United States Patent Office 3,365,373
Patented Jan. 23, 1968

3,365,373
SUPPORT STRUCTURE FOR NUCLEAR
REACTOR CALANDRIA TANK
Gilles Aubert, Bievres, Jean Marc Hässig, Orsay, Alphonse Peuchmaur, Boulogne-sur-Seine, and Roland Roche, Clamart, France, assignors to Commissariat à l'Energie Atomique, Paris, France
Filed May 31, 1966, Ser. No. 553,796
Claims priority, application France, June 3, 1965, 19,350
5 Claims. (Cl. 176—87)

ABSTRACT OF THE DISCLOSURE

Calandria support structure for liquid moderated nuclear reactors is made up of an assembly of leak-tight box elements through which at least one pressure tube extension passes and is supported by the associated box element. Each box element has an independent subassembly supporting a group of tube extensions in horizontal rows. Each box element is a parallelipipedal casing of metal filled with shielding material. The box elements support each other at bearing points and prestressed cables pass through passageways in the box elements to provide rigidity of structure. The bearing points may each comprise members forming a housing in which a centering block is placed to prevent relative displacement of the box elements. Each bearing point may also be made up of two annular members fixed to superposed box elements centered by a cylindrical ring and surrounding the cables.

---

This invention is concerned with a reactor tank support structure, especially for a nuclear reactor of the liquid-moderated type comprising a leak-tight moderator tank or calandria which is traversed by pressure tubes containing the fuel elements, said fuel elements being cooled by a flow of gas under pressure.

Reactor tanks or so-called calandrias comprising pressure tubes and especially horizontal tube systems are already known in which said tubes are supported directly on the calandria end-shields and traverse these latter in leak-tight manner. Tanks of this type usually comprise double-walled end-shields providing a space which is filled with shielding material, usually heavy water, which also performs the function of neutron-moderator. However, calandria tanks comprising double-walled end-shields present considerable difficulties both in their construction and in the development of leak-tight mechanical joints between the end-shields and the pressure tubes, particularly when said tubes are of substantial size.

The aim of this invention is to provide a calandria support structure consisting of a composite wall which duplicates each end-shield of said calandria while being independent of said end-shields.

The aforesaid structure is mainly characterized in that it is made up of an assembly of leak-tight box elements, each box element being adapted to support at least one pressure-tube extension which traverses said element.

Preferably, each box element constitutes an independent sub-assembly which supports a group of tube extensions disposed in at least one horizontal row and is designed in the form of a parallelipipedal casing constituted by a leak-tight metallic envelope filled with suitable shielding material. The different box elements are supported on each other by means of bearing points, rigidity of the structure which is formed by the box-element assembly being provided by prestressing cables which are passed through the structure within passageways formed in the box elements.

In a first embodiment, each bearing point is constituted by two identical members which are rigidly fixed respectively to two superposed box elements so as to form between said members a housing for a centering block which prevents any relative displacement of the box elements. As an advantageous feature, a clearance is provided between each centering block and the bottom of its housing for the purpose of taking up any differential expansion which may occur.

In another embodiment, each bearing point is constituted by two annular members which are rigidly fixed to two superposed box elements, said annular members being centered by means of a cylindrical ring and so arranged as to surround the prestressing cables which provide rigidity of the structure.

Finally, each leak-tight box element is preferably provided with a transverse double step in the central portion thereof in such a manner that the different box elements can be assembled in interfitting relation and that no passage in direct line is afforded along the contact surfaces of said elements for the radioactive radiations which emanate from the reactor core.

The different arrangements referred-to above which can be employed either separately or in combination will be explained in greater detail in the following description of one exemplified embodiment which is given solely by way of indication and not in any limiting sense.

Figure 1:
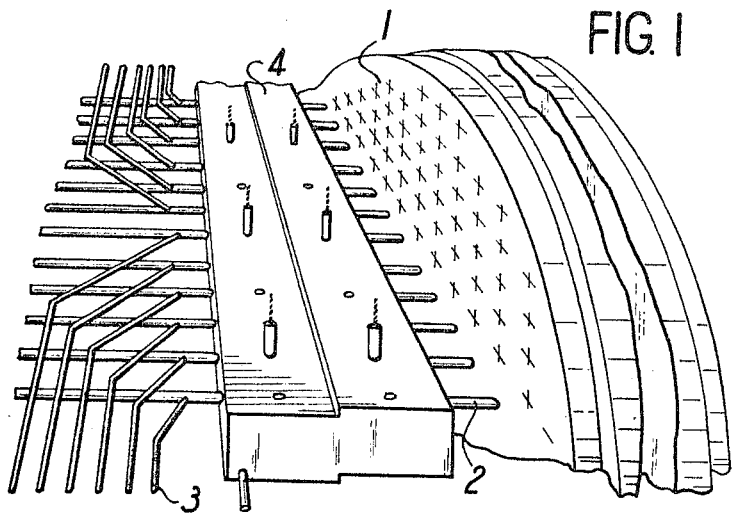
FIG. 1 is a diagrammatic view in perspective which illustrates the relative positions of a reactor calandria, of horizontal pressure tubes and of a leak-tight box element which is employed in the construction of a support structure in accordance with the invention.

Reference will now be made to FIG. 1, which shows diagrammatically the calandria end-shield 1 of a liquid-moderated nuclear reactor and a series of pressure-tube extensions such as the extension 2, these tubes being horizontal and grouped together in parallel rows (only one row appears in the figure for the sake of clarity of the drawings). Inlet ducts such as the duct 3 are joined to the tube extensions 2 and serve to admit pressurized gas into the pressure tubes for the purpose of cooling the fuel elements contained therein. As can be seen from this figure, the end-shield 1 is joined to the calandria shell 1a by means of an expansion step 1b, the function of which is to endow the shell with longitudinal flexibility while limiting the volume of the calandria at each end, thereby producing a gain in the quantity of liquid moderator (heavy water) which is contained in the calandria and which surrounds the pressure tubes.

In accordance with the invention, the pressure tubes are supported, not by the calandria end-shield, but by metal box elements 4 which are traversed by the pressure tube extensions.

Figure 2:
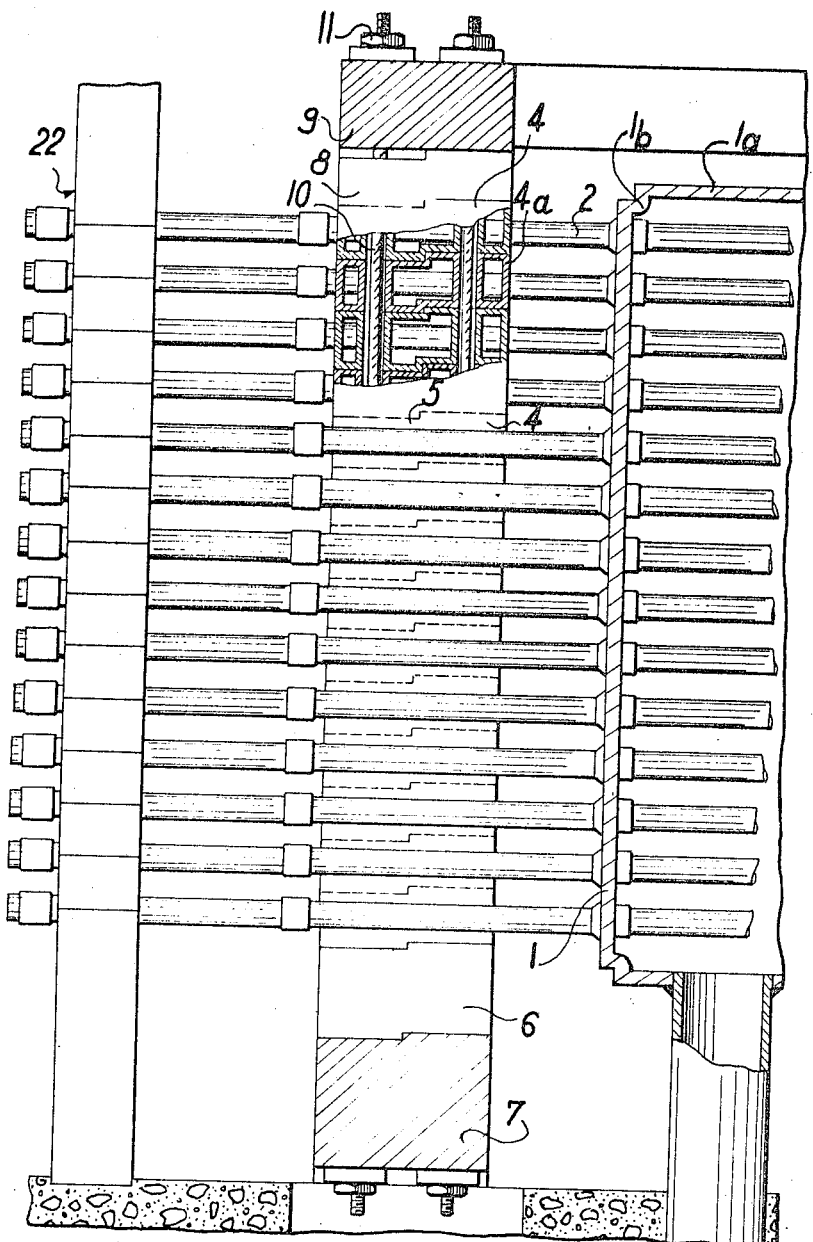
FIG. 2 is a vertical sectional view of said support structure.

FIG. 2 illustrates in greater detail the general design of a support structure which is contemplated by the invention. Said support structure is constituted by the assembly of a predetermined number of box elements 4 of the type referred-to above, each box element being provided in the central portion thereof with a transverse staggered section or double step 5 in such a manner that the different box elements may be superposed in interfitting relation. Said box elements are constituted by a metallic envelope 4a forming a casing which is advantageously filled with adequate shielding material, especially heavy water. The lowermost box element 6 of the assembly rests on a rigid beam 7 whilst the uppermost box element 8 is surmounted by a second beam 9 which is parallel with the first. The two beams 7 and 9 are joined together by prestressing cables 10 which are passed through the complete assembly of box elements 4 of the structure, said cables being rigidly fixed to and tensioned on each side of the two beams by means of conventional systems 11 which serve to adjust the tension to a selected value.

Figure 4:
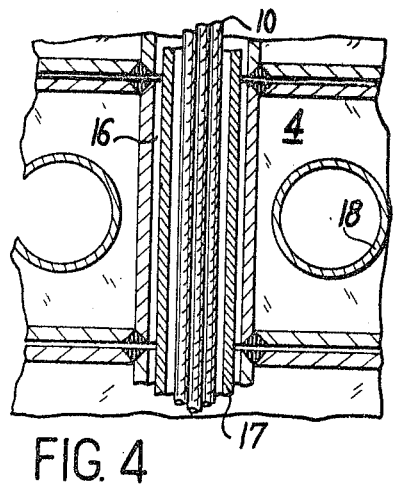
FIGS. 3 and 4 are views on a larger scale which illustrate two particular details of FIG. 2.
Figure 3:
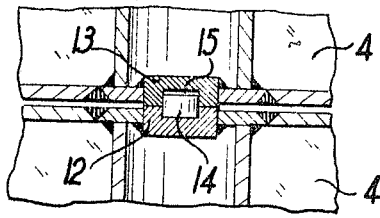

FIGS. 3 and 4 illustrate more clearly the design of bearing members which are provided between the different box elements 4 with respect to each other and the design of the passageways which are provided through the box elements for the cables 10 which interconnect the beams 7 and 9. Each box element 4 is respectively fitted at the top and bottom portions thereof with members 12 and 13 which are brought into contact and form between each other a housing in which is placed a centering block 14 for the purpose of ensuring the relative positioning of the different box elements. A clearance 15 is provided between the centering block 14 and the member 13 for the purpose of accommodating any differential expansion which may take place. In addition, vertical passageways 16 (as shown in FIG. 4) are formed through the box elements for the cables 10, each passageway being fitted with a shield tube 17 which is rigidly fixed to the corresponding box elements. Finally, each box element 4 is provided with transverse bores 18 for the insertion therethrough of the pressure tube extensions 2.

Figure 5:
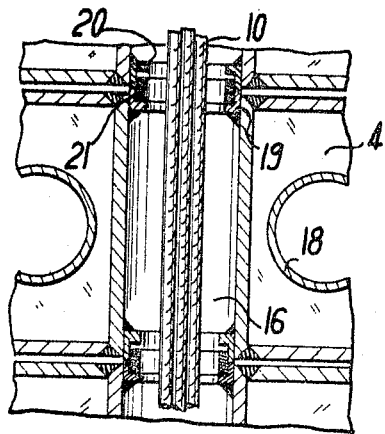
FIG. 5 illustrates an alternative form of the arrangement which is shown in FIG. 4.

FIG. 5 illustrates an alternative form in which the bearing points formed between the different box elements 4 are transferred to the level of the passageways 16 which are provided for the prestressing cables 10. In this case, the members which are fixed on the ends of each box element consist of annular members 19 and 20 which directly surround the cables 10 and between which are placed rings such as 21 whose function is identical with that of the centering blocks of the previous embodiment.

The calandria support structure which is thus formed prevents the end-shields of the reactor tank from being subjected to bending stresses, in view of the fact that the weight of the pressure tubes is carried directly on the box element assembly. In particular, this facilitates the formation of leak-tight metallurgical joints which must necessarily be provided between the pressure tubes and tube extensions at the level of the calandria end-shields. Finally, the support structure can readily be duplicated by a second shield wall such as the wall 22 (as shown in FIG. 2) which can be either stationarily fixed or slidably mounted along the pressure tube extensions. A wall of this type can be formed by means of a box element assembly which is identical with the assembly of the support structure itself or else by means of superposed cast-iron plates.

As will be clearly understood, the invention is not limited in any respect to the modes of construction which have been described and illustrated and which have been given solely by way of example.

What we claim is:

1. A support structure for a nuclear reactor having pressure tube extensions comprising an assembly of leak-tight box elements, at least one pressure tube extension traversing each of said box elements and supported thereby, each box element including an independent subassembly supporting at least one row of tube extensions, each of said box elements being a metallic parallelipipedal casing, shielding material in said casing, bearing points for said box elements, said box elements being supported on each other by said bearing points, prestressed cables passing through the support structure and through said box elements and two beams at each end of said support structure connected by said cables for structural rigidity.

2. A support structure as described in claim 1, each of said bearing points comprising two identical members rigidly fixed respectively to two superposed ones of said box elements, a housing formed between said members and a centering block in said housing preventing relative displacement of said box elements.

3. A support structure as described in claim 2, a clearance being provided between each of said centering blocks and the bottom of its housing.

4. A support structure as described in claim 1, each bearing point including two annular members rigidly fixed to two superposed ones of said box elements and a cylindrical ring centering said annular members, said annular members surrounding said cables.

5. A support structure as described in claim 1, each of said box elements having a transverse double step in the central portion thereof and said box elements being assembled in interfitting relation.

References Cited

UNITED STATES PATENTS

| | | | |
|---|---|---|---|
| 2,732,226 | 1/1956 | Brattberg | 248—56 X |
| 2,736,696 | 2/1956 | Wigner et al. | 176—83 X |
| 2,850,447 | 9/1958 | Ohlinger et al. | 176—62 X |
| 2,853,624 | 9/1958 | Wigner et al. | 176—87 X |
| 3,084,830 | 4/1963 | Koelsch | 220—97 |
| 3,208,915 | 9/1965 | Campbell et al. | 176—64 X |
| 3,293,139 | 12/1966 | Bellier | 176—87 X |

FOREIGN PATENTS 846,256  1/1964  Great Britain.

REUBEN EPSTEIN, *Primary Examiner.*